US006991171B2

(12) United States Patent
Benzing et al.

(10) Patent No.: US 6,991,171 B2
(45) Date of Patent: Jan. 31, 2006

(54) HOLDING DEVICE FOR CHIP CARDS WHICH ARE USED IN VEHICLES AND HAVE THE PURPOSE OF PERSON-RELATED COLLECTION OF TRAVEL DATA

(75) Inventors: Kurt Benzing, Villingen Schwenningen (DE); Klaus Hug, Oberndorf (DE); Dieter Klostermeier, Villingen-Schwenningen (DE); Andreas Lindinger, Flötzlingen (DE); Christoph Schubert, Rottweil (DE)

(73) Assignee: Siemens Aktiengesellschaft, München (DE)

( * ) Notice: Subject to any disclaimer, the term of this patent is extended or adjusted under 35 U.S.C. 154(b) by 51 days.

(21) Appl. No.: 10/656,105

(22) Filed: Sep. 8, 2003

(65) Prior Publication Data
US 2005/0052478 A1    Mar. 10, 2005

(30) Foreign Application Priority Data
Mar. 14, 2001    (DE)    ................ 101 12 061

(51) Int. Cl.
 *G06K 7/00*    (2006.01)
(52) U.S. Cl. .............. 235/486; 235/451; 235/441; 235/453; 361/684; 361/680
(58) Field of Classification Search ............ 235/486, 235/451, 441, 453, 483, 492, 475; 361/684, 361/680
See application file for complete search history.

(56) References Cited

U.S. PATENT DOCUMENTS
4,644,368 A    2/1987    Mutz

| | | | | |
|---|---|---|---|---|
| 5,043,562 A | * | 8/1991 | Hautvast et al. | 235/440 |
| 5,187,646 A | * | 2/1993 | Koch | 361/684 |
| 5,331,144 A | * | 7/1994 | Shima et al. | 235/486 |
| 6,250,552 B1 | * | 6/2001 | Hirasawa | 235/475 |
| 6,437,815 B1 | * | 8/2002 | Burkart | 235/479 |
| 6,439,903 B1 | * | 8/2002 | Burkart | 235/479 |
| 6,470,762 B1 | * | 10/2002 | Burkart | 235/479 |
| 6,775,169 B1 | * | 8/2004 | d'Acoz et al. | 365/52 |
| 2002/0085339 A1 | * | 7/2002 | Hug | 361/680 |

FOREIGN PATENT DOCUMENTS
EP    0899676    3/1999
JP    09319839    12/1997

OTHER PUBLICATIONS

Derwent-Abstract; EP-0899676A2; Mar. 3, 1999; Mannesmann VDO Aktiengesellschaft, D-60388 Frankfurt am Main (Germany).
Patent Abstracts of JP-09319839; Dec. 12, 1997; Oki Electric Ind. Co. LTD; (Japan).

* cited by examiner

*Primary Examiner*—Karl D. Frech
*Assistant Examiner*—Allyson N Trail
(74) *Attorney, Agent, or Firm*—Siemens AG; Jacob Eisenberg

(57)    ABSTRACT

The aim of the invention is to prevent the plate contacts of chip cards from wearing as a result of vibrations that occur during the operation of a vehicle. To achieve this, the spring contacts of the read/write set of contacts in a holding device for chipcards are separated from the plate contacts of a chip card that has been inserted into the holding device, for a period, during which no trip or driver-related data is transmitted and said contacts are closed for only a relatively short time, i.e. during the reading of the chip card data into the relevant data recording device and during the writing of recorded data to the chip card. The holding device is configured in such a way that the relevant chip card remains inaccessible when the contacts are separated.

8 Claims, 4 Drawing Sheets

HOLDING DEVICE FOR CHIP CARDS WHICH ARE USED IN VEHICLES AND HAVE THE PURPOSE OF PERSON-RELATED COLLECTION OF TRAVEL DATA

BACKGROUND OF THE INVENTION

The invention relates to a holding device for chip cards which are used in vehicles, have the purpose of person-related collection of travel data and which have a card holder which guides the chip cards between a removal position and a read/write position, and have output means, the output means bringing about, after the actuation of a request element, transfer of a chip card in the read/write position into the removal position.

The collection, in particular, of working times and times of rest of the drivers of utility vehicles requires, because of the documentary value of this data, reliable protections for avoiding disruptions which are carried out with fraudulent intent, for example by briefly pulling on a chip card during the transmission of data between the data collection device and the chip card or by virtue of the fact that films or electrically conductive material are pushed forward into the holding device of the chip cards. On the other hand, there is the risk of functional faults owing to the considerable climatic fluctuations which occur in the environment in which a utility vehicle is used, and consequently temperature-related and moisture-related changes in the material and also the oscillation level and travel-related vibrations which occur while the utility vehicle is operating.

These mechanical oscillations can lead, for example, to rapid wear of contacts, that is to say to complete wearing through of the relatively thin surface contacts of the chip cards which are embodied as small gold plates if there are relative movements between a chip card which is in the read/write position and the set of read/write contacts which is assigned to the chip card.

Owing to the vehicle-related application, in terms of the manufacture and mounting of a holding device for the chip cards it is basically to be assumed that tolerances which are appropriate for large scale manufacture are provided, and depending on the tolerance situation a more or less large sensitivity to oscillation occurs between a chip card and the read/write contacts which are positioned on it. Considerable additional tolerances have to be taken into account in particular if the holding device for the chip cards is not manufactured as an autonomous assembly which is functionally complete but rather the card holder and the set of read/write contacts are mounted separately from one another, for example on a printed circuit board of a tachograph which is used as a data collection device. In addition, the levelness of printed circuit boards is subject to tolerances and to climate-related fluctuations, and the chip cards have relatively large differences in thickness and can be bent.

SUMMARY OF THE INVENTION

An object of the present invention has thus been to provide a holding device in which, despite the compatibility with large scale manufacture and the robustness which are necessary for use in a utility vehicle as well as the necessary protection against tampering, oscillation-related and vibration-related wear of the plate contacts of the chip cards is largely reduced.

The means of achieving the object which is set are characterized in that the holding device is assigned an apparatus which, after a chip card has been input into the read/write position and after data has been read out from the input chip card, disconnects the spring contacts of a set of read/write contacts from the plate contacts of the chip card, closes the spring contacts of the set of read/write contacts after the request element has been actuated, and the plate contacts of the chip card which has been input, and triggers a release of the output means after travel data which has been collected in the meantime in a memory which is independent of the chip card has been written into the chip card.

One preferred exemplary embodiment provides that the inputting and outputting of chip cards take place automatically, a conveying means which is actuated by motor engaging in the movement space of the chip card, that the transfer path of the chip card within the holding device is longer than the length of a chip card, and that, apart from a switch which signals a pushing forward and removal as well as the reaching of the read/write position of a chip card there is provided at least one further switch which, when a chip card is displaced in the output direction, signals disconnection of the plate contacts of the chip card from the spring contacts of the set of read/write contacts when the removal position has not yet been reached.

A specific exemplary embodiment which is suitable for a holding device which has a smaller transfer path in comparison with the preferred exemplary embodiment is characterized by the fact that the card holder and the set of read/write contacts are attached to one and the same carrier, and that the spring contacts of the set of read/write contacts can be raised or lowered at right angles to a chip card in the read/write position by means of an auxiliary force, in particular that an actuation element which connects the free ends of the spring contacts of the set of read/write contacts is provided, and that an electromagnet which is attached to a printed circuit board is assigned to the set of read/write contacts in such a way that the armature of the electromagnet is operatively connected to the actuation element.

The novelty whose implementation includes a method in which the data of a chip card, when the latter is pushed forward into the holding device, or read into a data memory of the data collection device and data which has been collected in the meantime is transmitted, before it is output, into the data memory of the chip card, or the data of the chip card is updated, at regular intervals, at the latest however when the chip card is to be output, makes it possible for the contacts of the chip card and set of read/write contacts to be closed only if data is transmitted. This means that in the rest of the time when a chip card is in the holding device the contacts are separated and thus oscillation-related wear of the plate contacts of the chip cards is not possible. At the same time, the invention ensures that a chip card and/or the holding device are protected against tampering even when the contacts are disconnected.

The preferred exemplary embodiment provides the smallest degree of expenditure in order to avoid oscillation-related wear of contacts. In this exemplary embodiment, only a second photoelectric barrier which signals the parked position of the chip card is necessary on condition that there is a sufficient conveying path, longer than the length of a chip card, available in the conveying direction of the chip cards in the holding device.

Another design of the holding device, in which a sufficient conveying path for disengaging the contacts when a chip card is inaccessible is not provided, makes it necessary to carry out a relative movement between the set of read/write contacts or merely its spring contacts and the card holder. Preferably, in this case, the set of read/write contacts is attached directly to a carrier, for example a printed circuit board, on which the card holder is also arranged. In the respective specific exemplary embodiment, the free ends of the spring contacts of the set of read/write contacts are secured in an actuation element which is operatively connected to the armature of an electromagnet. The latter can also be mounted directly on the printed circuit board and placed in contact with corresponding conductor tracks, specifically on the opposite side from the set of read/write contacts. The electromagnet is preferably configured in such a way that when current is supplied to the coil winding, the armature of the electromagnet acts on the actuation element, and the contacts of the chip card and set of read/write contacts are thus closed, that is to say the actuation element and the armature can be arranged as components which are independent of one another in the respective structural unit.

BRIEF DESCRIPTION OF THE SEVERAL VIEWS OF THE DRAWINGS

The invention will be explained in more detail below with reference to drawings, in which.

DETAILED DESCRIPTION OF THE INVENTION

Figure 1:
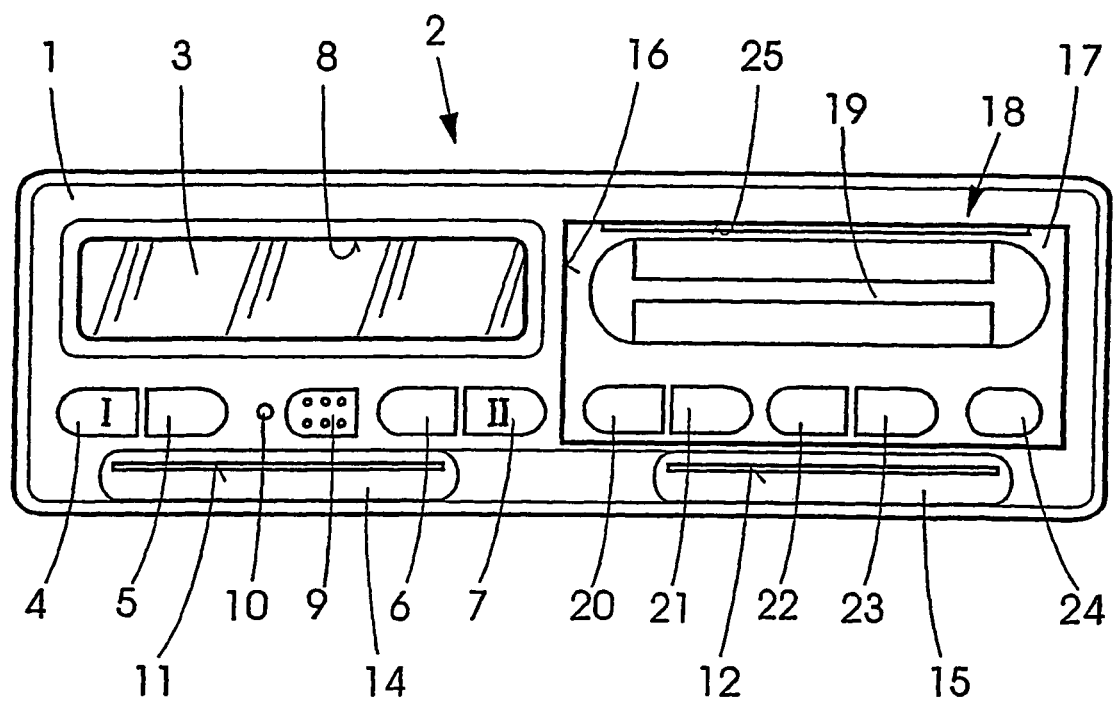
FIG. 1 shows a front view of a tachograph.

In FIG. 1, a shutter or a front panel of the respective tachograph 2 is designated by 1, said shutter or front panel terminating at the front a housing with a rectangular cross section (not shown in FIG. 1) which extends at right angles to the plane of the page. A display device 3 and keys 4, 5 and 6, 7 are guided in the front panel 1 in a secured fashion, the keys 4(I) and 7(II) are used to register the driver and front seat passenger, the keys 5 and 6 are used to request the chip cards assigned to the respective driver and front seat passenger. 8 designates a window cut out which is formed in the front panel 1 for observation purposes. A cover 9 which is mounted in a sprung fashion covers a plug socket; 10 represents a warning lamp. Slots 11 and 12 are used to input the chip cards of the driver and front seat passenger into suitable holding devices of the tachograph 2, one of which is illustrated as FIG. 2 and designated by 13. The slots 11, 12 are, as is shown also by FIG. 1, basically formed from respectively funnel-shaped depressions 14 and 15. In addition, a cutout 16, which is covered by a front element 17 of a printing device 18 is provided in the front panel 1, said coverage being such that the front element 17 is pushed forward into the front face of the front panel 1 of the tachograph 2 in a structural fashion, in particular flush with the surface.

For the sake of completeness it should be noted that the printing device 18 comprises a carriage by means of which it can be moved out of the tachograph 2. A bistable latching gear, which can be unlocked and locked by actuating the front element 17, which thus serves as a key, can be assigned to the carriage. In addition, a plurality of keys 20, 21 and 22, 23 and 24 are mounted in the front element 17 which is provided with a gripping bar 19. Said keys serve, together with the keys 4 and 7, for the selection of the most important working time data by the driver and front seat passenger, for leafing forward and backward in the respective data records of a selected type of data and for triggering printing. 25 designates an outlet opening for the printed recording material.

Figure 2:
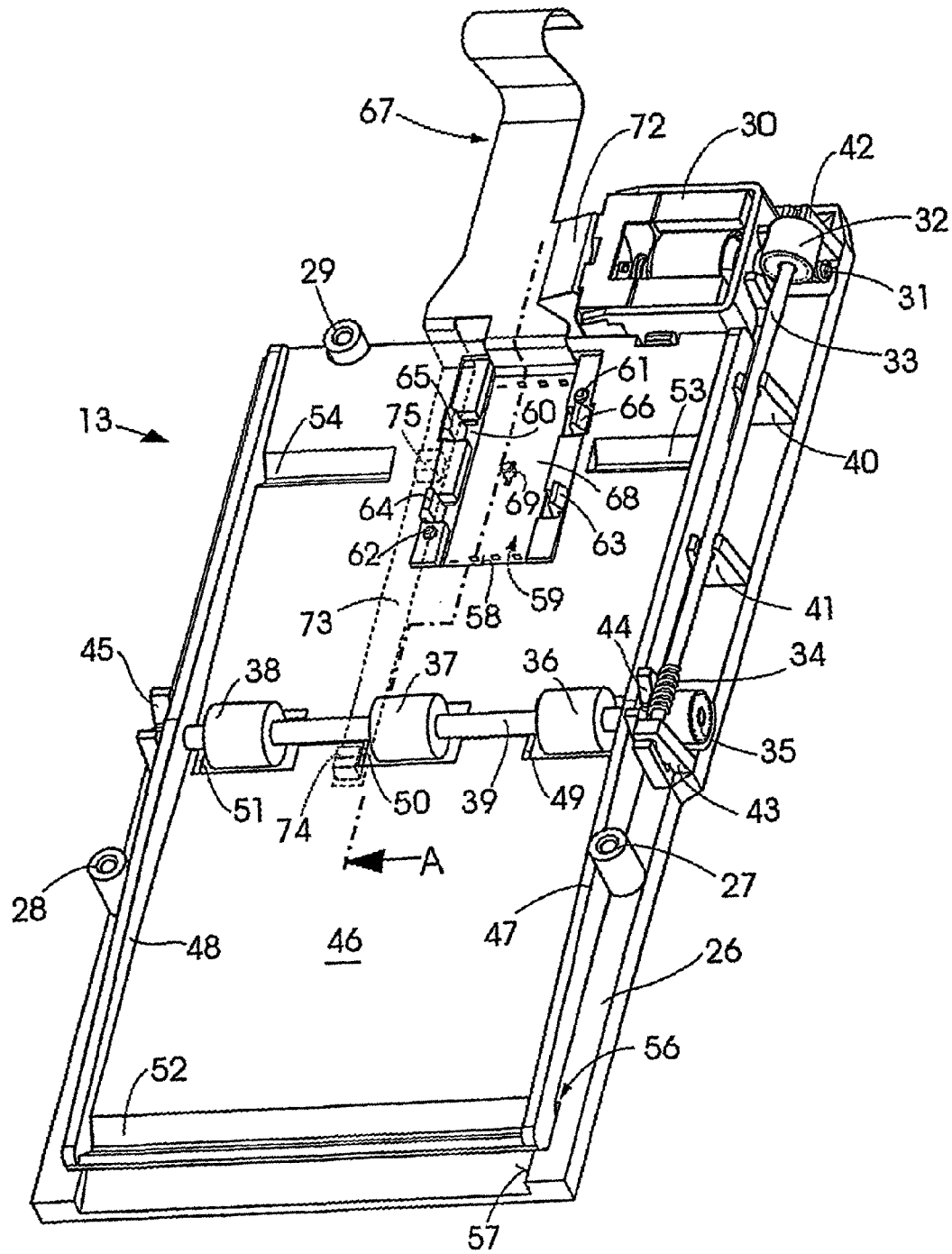
FIG. 2 shows a holding device, embodied as an autonomous assembly, in a perspective view.
Figure 3:
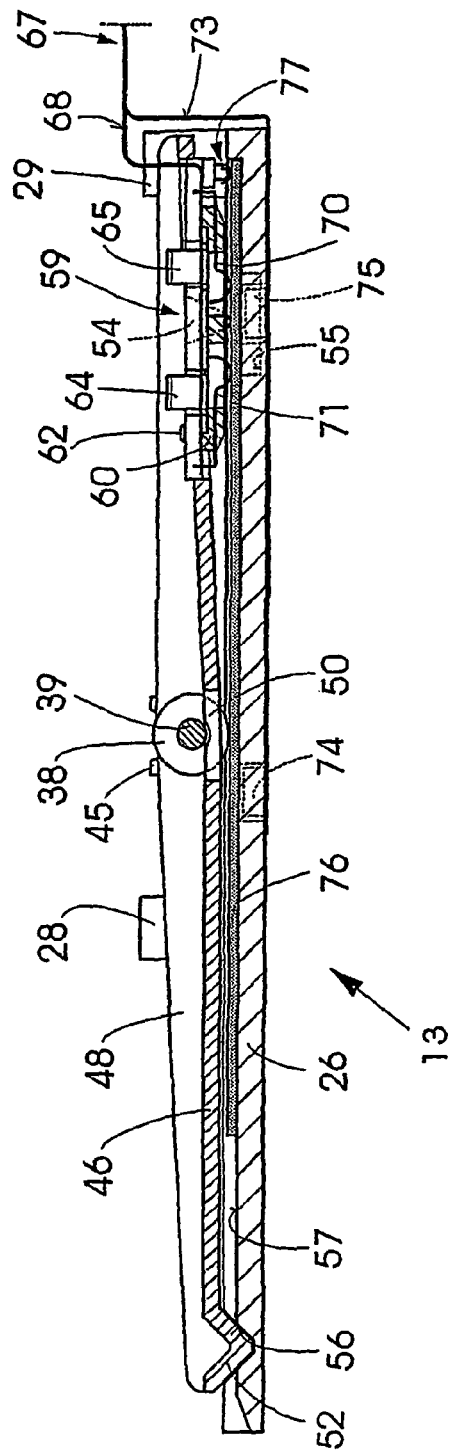
FIG. 3 shows a section along the sectional line A in FIG. 2, a chip card which is input into the holding device being located in the read/write position.
Figure 4:
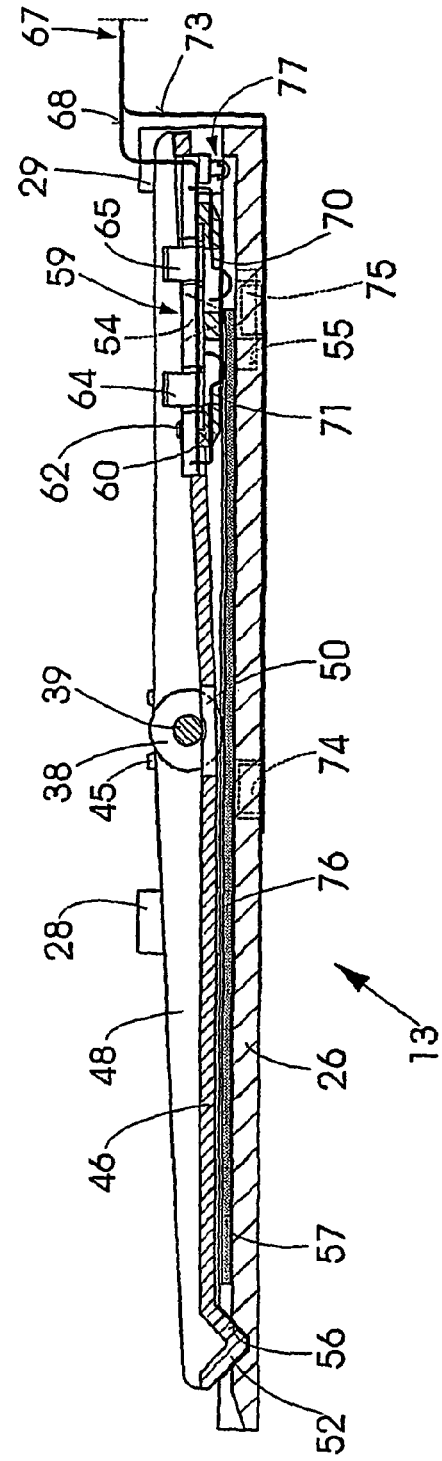
FIG. 4 shows a view according to FIG. 3 in which the chip card is located in a parked position in which the contacts of the chip card and set of read/write contacts are separated, the holding device being however closed off in an inaccessible fashion.

The holding device 13 which is illustrated in FIG. 2 has a plate-shaped card holder 17 on which spacing bolts 27, 28 and 29, provided with threaded bores which are not designated in more detail, are formed for connecting the holding device 13 by means of flanges at the installation location, in this case to a printed circuit board of the tachograph 2. 30 designates a drive motor which is preferably a DC motor which engages with an obliquely toothed cylindrical gear 32 via a worm 31 which is arranged on the shaft of said DC motor. Said cylindrical gear 32 is attached to a connecting shaft 33 which is mounted on the card holder 26 and intermeshes via a worm 34 with a gearwheel 35 which is also embodied as an obliquely toothed cylindrical gear and is connected fixed in terms of rotation to a conveying shaft 39 which bears a plurality of friction elements 36, 37 and 38. Supporting pillars and bearing arms which are formed on the card holder 26 and assigned to the connecting shaft 33 are designated by 40, 41, 42 and 43. The conveying shaft 39 is mounted in bearing limbs 44 and 45 which are also formed on the card holder 26. On the other side, the conveying shaft 39 of a rocker 46 serves as a bearing axle. The rocker 46, which is embodied as a plate-shaped body which is provided with side elements 47 and 48, has breakthroughs 49, 50 and 51 for reaching the friction elements 36, 37, 38 in the movement space of the chip cards and is provided on the one hand with a closing element 52 which is directly formed on, as well as with key elements 53 and 54. The latter are recesses 55 which are formed in the cardholder 26; the closing element 52 interacts with a groove 56 which corresponds to the closing element 52. 57 designates a mount which is recessed into the card holder 26 and has the purpose of guiding the chip cards. As is also apparent from FIG. 2, a cutout 58, into which a set 59 of read/write contacts can be pushed forward from the side of the rocker 46 which is assigned to the data cards is also provided in the rocker 46. Here, pin connections 61 and 62 which are formed between a frame 60 of the set 59 of read/write contacts and the rocker 46 have the purpose of orienting the set 59 of read/write contacts and locking latches 63, 64, 65 and 66 which are formed on the frame 60 have the purpose of locking the set 59 of read/write contacts on the rocker 46. A section, connected to the set 59 of read/write contacts, of a flexible conductor track 67 is designated by 68; a centering pin 69 serves to orient the section 68 of the conductor track before it is soldered to the individual spring contacts, embodied as leaf springs, of the set 59 of read/write contacts, two of which are illustrated in FIGS. 3 and 4 and designated by 70 and 71. A further section 72 of the conductor track is used to electrically connect the drive motor 30. 73 designates a conductor track belt, with which reflective light barriers 74 and 75 are placed in contact. The conductor track belt 73 is, as is shown by FIGS. 3 and 4, attached to the underside of the card holder 26; suitable breakthroughs (not designated in more detail) in the card holder 26 are assigned to the reflective light barriers 74, 75. For the sake of completeness, it is also to be noted that, for example, leaf springs are not absolutely necessary but expediently assigned to the rocker 46, said leaf springs being attached to the card holder 26 and acting on the rocker 46 in such a way that even when a card holder 26 does not have a chip card pushed forward into it, the closing element 52 is always in engagement with the groove 56, and in this way exerts a sealing function. If, in this state of the holding device, a chip card 76 is pushed forward into the tachograph 2 through one of the pre-orienting slots 11 or 12 in the front panel 1 and has been introduced manually as far as the friction elements 36, 37, 38 of the conveying shaft 39, the rocker 46 is lifted up, owing to the wedge mechanism effect between the closing element 52 and the chip card 76 and pivoted about the conveying shaft 39 and triggers a switching function of the reflective light barrier 74 which actuates the drive motor 30. As a result, the conveying shaft 39 is driven, and the chip card 76 is transferred further, specifically automatically, as far as the delimitation of the mount 57 and until the drive motor 30 is switched off by a switch 77 which signals when the read/write position of a chip card 76 is reached, and is preferably structurally arranged in the frame 60 of the set of read/write contacts. While the chip card 76 is being transferred into the read/write position, the rocker 46 has been pivoted back into the closed position either owing to the aforementioned leaf springs (however not illustrated) or else in conjunction with the key elements 53, 54, and, as is apparent from the sectional view in FIG. 3, has been automatically locked in this position owing to the small degree of play between the chip card 76 and the key elements 53, 54. After the chip card 76 has been positioned in the write/read position, a testing procedure is carried out and the data which is stored in the chip card 76 is read out.

According to the invention, the chip card 76 is then displaced, that is to say the drive motor 30 and thus the conveying shaft 39 are actuated as a function of a program so as to output the chip card 76. The conveying of the chip card 76 in the output direction is stopped as soon as a change in state of the reflective light barrier 75 occurs. In the parked position which is then reached, the contacts of the set 59 of read/write contacts are disconnected, as is shown by FIG. 4, from the contacts of the chip card 76, but the rocker 46 remains locked. At the latest when one of the keys 5 or 6 is actuated and the chip card 76 is to be output, the chip card 76 is firstly transferred back into the read/write position and the data of the chip card 76 is updated in accordance with the travel-dependent data and events which have been collected in the meantime in the memory of the tachograph 2 inside the device. Then, also under program control, the chip card 76 is transferred into the removal position, where it can be removed manually, and in this process a signal of the reflective light barrier 74 deactivates the drive motor 30. If the chip card 76 is not removed immediately, the drive motor 30 is stopped under time control.

For the sake of completeness it will also be noted that when the chip card 76 is output, the reflective light barrier 75 is without effect and the rocker 46 is caused to pivot automatically as a result of the interaction of the wedge-shaped closing element 56 with the chip card 76. In addition, it is to be noted that it is expedient to update the data of a chip card 76 in the holding device 13 relatively often, for example when a defined quantity of data is reached, so that a chip card can be output in a relatively short time. Shock-related displacements of the chip card 76 are therefore not critical insofar as a program is used to check whether there is still in general a chip card 76 in the holding device 13, and if this is the case, the data-reading and conveying routine according to the invention is repeated several times within the holding device 13 between the read/write station and the parked position, if necessary.

In other embodiments of the holding device, which only permit the chip cards to be pushed forward manually, or allow the chip cards to be pulled in automatically over a distance which is not conceivable for the contacts of a chip card and of the set of read/write contacts to be moved apart as a result of the displacement of the chip card, it is conceivable to construct the set of read/write contacts as a carriage or to arrange said set of contacts on a carriage which is mounted on a carrier, in a displaceable fashion, not necessarily displaceable in the direction of movement of the chip cards, which may be the printed circuit board of a device, for example of a tachograph. However, one expedient variant can also consist in that, in the fact that the set of read/write contacts is fixedly arranged, and the card holder is pivotally mounted, the card holder being capable of being engaged with an eccentric shaft which can be activated by motor.

Figure 5:
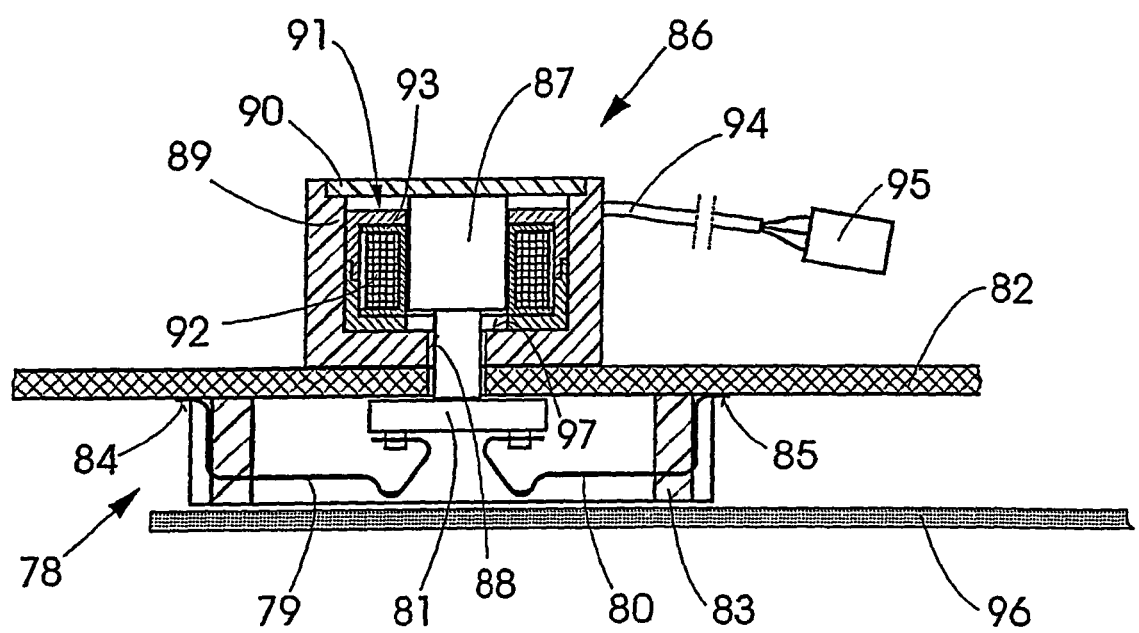
FIG. 5 shows a largely schematic sectional view of an arrangement for closing the contacts for a chip card and a set of read/write contacts for a holding device in which a conveying movement of a chip card is not possible in the locked state.

FIG. 5 proposes an exemplary embodiment which, for the purpose of separating the contacts of the chip card and set of read/write contacts, provides for the spring contacts of the set of read/write contacts and the plate contacts of a chip card to be closed and respectively separated under electro-magnetic control, specifically at right angles to the plane of movement of the chip card. For this purpose, the free ends of the spring contacts (two of at least six are illustrated in FIG. 5 and designated by 79 and 80) which are embedded or mounted in a set 78 of read/write contacts are secured in an actuation element 81. 82 designates a carrier, for example a printed circuit board, to which the set 78 of read/write contacts is attached in that the ends 84, 85, mounted in a frame 83 of the set 78 of read/write contacts, of the spring contacts 79, 80 are soldered to conductor tracks of the printed circuit board 82. An electromagnet 86 whose armature 87, which is of stepped construction for the necessary limitation of the travel, engages on the actuation element 81 through an opening 88 in the printed circuit board 82 is arranged on the opposite side of the printed circuit board 82. The electromagnet 86 is composed, as is also apparent from FIG. 5, of a pot-shaped housing 89 which can be closed off by a cover plate 90, a two-component return ring 91 pushed forward into the housing 89, and a coil body 93 which bears the winding 92. The connecting lines 94 of the (not illustrated in FIG. 5) in the return ring 91 and in winding 92, which are guided through suitable openings the housing 89 are closed off in the exemplary embodiment according to FIG. 5 by means of a plug 95. However, it is also conceivable to construct the electromagnet 86 in such a way that it can be provided with connecting lugs and equipped and soldered with SMDs. 96 designates a chip card which is located in the read/write position.

In the functional state illustrated in FIG. 5, the winding 92 of the electromagnet 86 is not supplied with current so that the armature 87 is lifted off from its stop, the bottom 97 of the housing 89 by the spring contacts 79, 80, preferably embodied as leaf springs, of the set 78 of read/write contacts. If the winding 92 is supplied with current, the armature 87, which strikes against the bottom 97 of the housing 89, acts on the actuation element 81 and moves the spring contacts 79 or 80 into a sprung operative connection with the plate contacts of the chip card 96. This solution has the advantage of low power consumption. On the other hand, it would also permit the likewise conceivable reverse function, that is the quiescent current mode which requires a fixed connection between the armature 87 and actuation element 81, by virtue of the fact that owing to the effect of a buffer battery which is internal to the device, travel data which has been generated can be written into the chip card memory even when the vehicle battery fails.

We claim:

1. A holding device for chip cards for collection of travel data, comprising:
    a card holder arranged to guide a chip card between a removal position, a park position wherein read/write contacts are disconnected from the chip card and the card is stored within the housing, and a read/write position;
    a request element comprising actuation means;
    output means arranged to bring about a transfer of the chip card from the read/write position into the removal position after an actuation of the request element; and
    means for manipulation arranged within the card holder to,
        disconnect spring contacts of a set of read/write contacts from plate contacts of the chip card after the chip card has been input into the read/write position and after data has been read out from the input chip card;
        close the spring contacts after the request element has been actuated and the plate contacts of the chip card have been input; and
        trigger a release of the output means after travel data which has been collected in the meantime in a memory which is independent of the chip card has been written into the chip card.

2. The holding device according to claim 1, further comprising
    means for automatically inputting and outputting chip cards;
    a motor arranged within a movement space of the chip card, the movement space defining a transfer path for the chip card within the holding device which is longer than the length of the chip card;
    transfer means arranged within the movement space so as to be engaged by the motor;
    a switch arranged to signal an insertion and removal as well as a reaching of the read/write position by the chip card;
    at least one further switch arranged to signal a disconnection of the plate contacts of the chip card from the spring contacts before a removal position has been reached, the at least one further switch being displaced in an output direction.

3. The holding device according to claim 1, wherein the card holder is mounted in the holding device so as to be pivotable in such a way that the plate contacts of the chip card in the read/write position can be disconnected from spring contacts of a fixedly arranged set of read/write contacts.

4. The holding device according to claim 3, further comprising a motor-actuated eccentric shaft assigned to the card holder.

5. The holding device according to claim 1, wherein the set of read/write contacts is mounted so as to be moveable relative to the card holder.

6. The holding device according to claim 5, wherein the set of read/write contacts is attached to a carriage which is displaceably assigned to the card holder.

7. The holding device according to claim 1, wherein the card holder and the set of read/write contacts are attached to a same carrier, and the spring contacts of the set of read/write contacts can be raised or lowered at right angles to a chip card in the read/write position by means of an auxiliary force.

8. The holding device according to claim 7, further comprising:
    an actuation element arranged to connect free ends of the spring contacts of the set of read/write contacts;
    a printed circuit board; and
    an electromagnet comprising an armature, the electromagnet being attached to the printed circuit board and assigned to the set of read/write contacts such that the armature is operatively connected to the actuation element.

* * * * *